United States Patent
Higashino et al.

(10) Patent No.: US 6,624,544 B2
(45) Date of Patent: Sep. 23, 2003

(54) NEUTRAL-POINT JOINT PORTION OF STATOR WINDING FOR AN ALTERNATOR

(75) Inventors: Kyoko Higashino, Tokyo (JP); Yoshihito Asao, Tokyo (JP); Katsumi Adachi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/737,564

(22) Filed: Dec. 18, 2000

(65) Prior Publication Data

US 2001/0026109 A1 Oct. 4, 2001

(30) Foreign Application Priority Data

Apr. 3, 2000 (JP) ........................................ 2000-100656

(51) Int. Cl.[7] .................... H02K 17/00; H02K 19/00; H02K 21/00; H02K 23/26; H02K 27/02
(52) U.S. Cl. ..................... 310/201; 310/254; 310/207; 310/198; 310/184; 310/179; 310/180; 310/71; 310/68
(58) Field of Search ................ 310/254, 207, 310/201, 198, 184, 180, 179, 71, 68, 68 D

(56) References Cited

U.S. PATENT DOCUMENTS

| 3,453,468 A | | 7/1969 | Lund .......................... 310/180 |
| 4,500,806 A | * | 2/1985 | Kanayama et al. ......... 310/198 |
| 4,616,407 A | * | 10/1986 | Tamaki et al. ............... 29/596 |

(List continued on next page.)

FOREIGN PATENT DOCUMENTS

| DE | A-199-22-794 | | 11/1999 | |
| EP | 0 751 609 A | | 1/1997 | |
| EP | 0 881 752 A | | 12/1998 | |
| EP | 0 978 927 A | | 2/2000 | |
| GB | 2034530 A | * | 6/1980 | |
| GB | 2070470 A | * | 9/1981 | |
| JP | 61135350 A | * | 6/1986 | .......... H02K/19/22 |
| JP | 63299754 A | * | 12/1988 | .......... H02K/19/36 |
| JP | 05308760 A | * | 11/1993 | .......... H02K/23/00 |
| JP | 06178479 A | * | 6/1994 | ............ H02K/3/28 |
| JP | 7-32555 | | 4/1995 | |
| JP | 7-115743 | | 5/1995 | |
| JP | A-11-155270 | | 6/1999 | |
| JP | 2001-178054 | * | 6/2001 | |
| JP | 2001-178093 | * | 6/2001 | |
| JP | 2001-186704 | * | 7/2001 | |
| KR | 1998-086538 | | 12/1998 | |

OTHER PUBLICATIONS

Patent Abstracts of Japan, vol. 007, No. 166 (E–188), Jul. 21, 1983 & JP 58 072358 A (Hitachi Seisakusho KK), Apr. 30, 1983 *abstract*.
Patent Abstracts of Japan, vol. 013, No. 126 (E–734), Mar. 28, 1989 & JP 63 294242 A (Mitsubishi Electric Corp), Nov. 30, 1988, *abstract*.
Patent Abstracts of Japan, vol. 1999, No. 11, Sep. 30, 1999 & JP 11 150904 A (Sawafuji Electric Co Ltd; Honda Motor Co Ltd), Jun. 2, 1999, *abstract*.

Primary Examiner—Nestor Ramirez
Assistant Examiner—Pedro J. Cuevas
(74) Attorney, Agent, or Firm—Sughrue Mion, PLLC

(57) ABSTRACT

A stator includes a cylindrical stator core and a stator winding composed of a three-phase stator winding portion constructed by connecting three winding phase portions into a three-phase star connection, a neutral point of the stator winding being electrically connected to a rectifier for rectifying alternating-current output, wherein each of strands of wire constituting the three winding phase portions is led out from a coil end group of the stator winding to an outer side to constitute a neutral-point terminal, each of the neutral-point terminals has a flat side surface portion, and a neutral-point joint portion of aid stator winding is constructed by abutting and electrically joining the flat side portions of the neutral-point terminals.

8 Claims, 8 Drawing Sheets

U.S. PATENT DOCUMENTS

| | | | | |
|---|---|---|---|---|
| 5,097,167 A | * | 3/1992 | Kanayama et al. | 310/201 |
| 5,233,246 A | * | 8/1993 | Yockey | 310/71 |
| 5,455,500 A | * | 10/1995 | Shichijyo et al. | 322/90 |
| 5,508,571 A | | 4/1996 | Shafer, Jr. | 310/71 |
| 5,986,375 A | * | 11/1999 | Umeda et al. | 310/180 |
| 5,998,903 A | * | 12/1999 | Umeda et al. | 310/179 |
| 6,051,906 A | * | 4/2000 | Umeda et al. | 310/179 |
| 6,124,660 A | * | 9/2000 | Umeda et al. | 310/215 |
| 6,144,136 A | * | 11/2000 | Umeda et al. | 310/254 |
| 6,198,190 B1 | * | 3/2001 | Umeda et al. | 310/179 |
| 6,201,332 B1 | * | 3/2001 | Umeda et al. | 310/184 |
| 6,204,586 B1 | * | 3/2001 | Umeda et al. | 310/179 |
| 6,208,058 B1 | * | 3/2001 | Taji et al. | 310/201 |
| 6,211,594 B1 | * | 4/2001 | Umeda et al. | 310/179 |
| 6,249,956 B1 | * | 6/2001 | Maeda et al. | 29/596 |
| 6,268,678 B1 | * | 7/2001 | Asao et al. | 310/201 |
| 6,275,404 B1 | * | 8/2001 | Shichijyo et al. | 363/145 |
| 6,285,105 B1 | * | 9/2001 | Asao et al. | 310/208 |
| 6,288,462 B1 | * | 9/2001 | Tanaka et al. | 310/71 |
| 6,326,715 B1 | * | 12/2001 | Asao et al. | 310/180 |
| 6,333,573 B1 | * | 12/2001 | Nakamura | 310/45 |
| 6,359,352 B2 | * | 3/2002 | Asao | 310/68 D |
| 6,373,163 B1 | * | 4/2002 | Oohashi et al. | 310/198 |
| 6,407,476 B1 | * | 6/2002 | Nishimura | 310/180 |
| 6,417,588 B2 | * | 7/2002 | Niimi et al. | 310/71 |
| 6,424,063 B1 | * | 7/2002 | Whitener et al. | 310/71 |
| 6,429,556 B1 | * | 8/2002 | Nakamura et al. | 310/71 |
| 6,469,413 B1 | * | 10/2002 | Oohashi et al. | 310/184 |
| 6,501,206 B2 | * | 12/2002 | Oohashi et al. | 310/184 |

* cited by examiner

NEUTRAL-POINT JOINT PORTION OF STATOR WINDING FOR AN ALTERNATOR

BACKGROUND OF THE INVENTION

1. Field of the Invention

The present invention relates to a stator for an alternator driven by an internal combustion engine, for example, and in particular, relates to the construction of neutral-point lead terminals in a stator winding of a three-phase alternator.

2. Description of the Related Art

FIG. 9 is a cross section showing a conventional alternator.

In FIG. 9, the alternator is provided with: a case 3 constructed from an aluminum front bracket 1 and an aluminum rear bracket 2; a shaft 6 rotatably mounted inside the case 3, a pulley 4 being fastened to a first end of the shaft 6; a Lundell-type rotor 7 fastened to the shaft 6; fans 5 fastened to both axial ends of the rotor 7; a stator 8 fastened to an inner wall of the case 3 so as to cover an outer circumferential side of the rotor 7; slip rings 9 fastened to a second end of the shaft 6 for supplying electric current to the rotor 7; a pair of brushes 10 which slide in contact with the slip rings 9; a brush holder 11 for holding the brushes 10; a rectifier 12 which is electrically connected to the stator 8 to convert alternating current generated in a stator winding 16 of the stator 8 into direct current; a heat sink 17 fitted onto the brush holder 11; and a regulator 18 mounted on the heat sink 17 for adjusting the output voltage generated in the stator 8.

The rotor 7 is composed of a rotor winding 13 for generating magnetic flux on passage of electric current, and a pair of pole cores 20 and 21 disposed so as to cover the rotor winding 13, magnetic poles being formed in the pole cores 20 and 21 by magnetic flux generated in the rotor winding 13. The pair of pole cores 20 and 21 are made of iron, each has a number of claw-shaped magnetic poles 22 and 23 disposed on an outer circumferential perimeter at even pitch in a circumferential direction so as to project axially, and the pole cores 20 and 21 are fastened to the shaft 6 facing each other such that the claw-shaped magnetic poles 22 and 23 intermesh.

The stator 8 is provided with a stator core 15, and a stator coil 16 which generates alternating current due to changes in magnetic flux produced by the rotor winding 13 accompanying the rotation of rotor 7 wound to the stator core 15.

In the automotive alternator constructed in this manner, electric current is supplied from a battery (not shown) through the brushes 10 and the slip rings 9 to the rotor winding 13, generating magnetic flux. The claw-shaped magnetic poles 22 of the pole core 20 are magnetized with north-seeking (N) poles by this magnetic flux, and the claw-shaped magnetic poles 23 of the pole core 21 are magnetized with south-seeking (S) poles. At the same time, rotational torque from the engine is transmitted through the belt and the pulley 4 to the shaft 6, rotating the rotor 7. Thus, a rotating magnetic field is applied to the stator winding 16, generating electromotive force in the stator coil 16. This alternating electromotive force passes through the rectifier 12 and is converted into direct current, the output thereof being adjusted by the regulator 18, and the battery being recharged.

The stator winding 16 of the stator 8 is generally a three-phase star connection, and the construction of the neutral-point connections therein is as shown in Japanese Patent Publication No. HEI 7-32555, for example.

In other words, as shown in FIG. 10, three winding phase portions are formed by winding strands of wire 24 into the stator core 15 for a required number of turns, the strands of wire 24 being composed of conducting wires having a circular cross section, and neutral-point terminals 25 of the three winding phase portions are led out from a coil end group, the three led-out neutral-point terminals 25 being brought together in one place and connected together by twisting. Then, as shown in FIG. 11, the three twisted neutral-point terminals 25 are fastened and integrated by soldering to form a neutral-point joint portion 27 which is a joint portion joining the three neutral-point terminals 25. In addition, although not shown, a neutral-point lead portion is disposed on the neutral-point joint portion 27.

Then, the neutral-point lead portion extending outwards from the neutral-point joint portion 27 extends outwards from the stator core 15 together with output terminals (output wires) 29 of each of the winding phase portions, and the neutral-point lead portion and the output terminals 29 are fastened by means of crimping to a terminal on a circuit board 12a in the rectifier 12 and are electrically connected by soldering, respectively. Thus, an alternator is provided in which output can be increased when the alternator is rotating at high speed by adding neutral-point voltage to the direct current output.

The neutral-point joint portion 27 is fastened and integrated by soldering the three neutral-point terminals 25, but in cases where the stator winding is constituted by two sets of the three winding phase portions, the neutral-point joint portion may be constructed by bringing six neutral-point terminals together in one place, connecting them by twisting them together, and fastening and integrating them by soldering.

It is desirable that the neutral-point lead portion and the output wires 29 extend outwards from the stator core 15 parallel to the axial direction to facilitate connection to the circuit board 12a.

Furthermore, because the neutral-point terminals 25 are led around, brought together in one place and soldered, there are cases when excessive leading around of the neutral-point terminals 25 occurs due to the relative positions of the slots in which the neutral-point terminals 25 are housed. Because the long lead-around of the neutral-point terminals 25 gives rise to problems such as bringing about an increase in the amount of conducting wire, which is a heat-generating body, in other words, an increase in the amount of heat generated and an increase in electrical resistance, reducing power-generating efficiency, or giving rise to breakage of the winding and interference with other parts due to vibration when the alternator is mounted to a vehicle, it is desirable to make the lead-around of the neutral-point terminals 25 as short as possible.

In order to suppress vibration of the neutral-point joint portions 27 and the neutral-point lead portions in the presence of vibration when the alternator is mounted to the vehicle, measures have been taken to secure the lead-around portions of the neutral-point terminals 25 by binding them to the coil ends using tie-shaped bodies passing through coil end apex portions, or applying varnish to fix them to the coil ends. However, when the lead-around portions are secured to the coil ends using tie-shaped bodies, the tie-shaped bodies must be passed between the narrow spaces between the strands of wire on the coil end apex portions, decreasing work efficiency, and when the lead-around portions are secured to the coil ends by applying varnish, it is difficult to obtain a sufficient degree of securing strength with a lowviscosity varnish because the lead-around portions and the coil ends are separated by a predetermined spacing, and improvements have been called for.

In the neutral-point joint portions 27 in a stator winding 16 constructed in this manner, because a number of neutral-point terminals 25 are gathered together in one place and twisted together into a bundle then fastened and integrated by soldering, the solder 26 cannot enter between the twisted neutral-point terminals 25, and a cavity A is formed in a central portion, as shown in FIG. 12, and one problem has been that sufficient joint strength cannot be achieved, making it difficult to ensure reliability.

Because a number of neutral-point terminals 25 are soldered together, another problem has been that a high capacity jig is needed and it is necessary to heat the joint portions sufficiently, making the soldering process time-consuming and costly.

Because a number of neutral-point terminals 25 are gathered together and twisted, yet another problem has been that workability is poor.

In order to eliminate the intricate operation of gathering and twisting a number of neutral-point terminals 25 by hand, an improvement has been proposed in which the neutral-point joint portion is constructed by aligning a number of neutral-point terminals such that end surfaces thereof are positioned in the same plane and soldering these end surfaces together. However, in that proposal, the soldered surface is reduced, making the joint insufficiently strong, and there has been a risk of dislodgment of the neutral-point joint portion occurring if it is subjected to continuous vibration. Thus, another problem has been that stops are required for integrally fastening the neutral-point terminals, increasing the number of work steps and preventing costs from being reduced.

SUMMARY OF THE INVENTION

The present invention aims to solve the above problems and an object of the present invention is to provide a stator for an alternator enabling reliability to be improved and costs to be reduced by disposing flat side surface portions on the neutral-point terminals of the strands of wire and constructing the neutral-point joint portions by abutting the side surface portions to each other and electrically joining them so as to eliminate the intricate process of integrating the neutral-point terminals by twisting or using stops and so as to easily ensure a sufficient degree of joint strength.

In order to achieve the above object, according to one aspect of the present invention, there is provided a stator for an alternator, the stator including:

a cylindrical stator core formed circumferentially with a number of slots extending axially; and a stator winding composed of a three-phase stator winding portion constructed by connecting three winding phase portions into a three-phase star connection, each of the winding phase portions being installed in the stator core by sequentially inserting strands of wire into the slots at predetermined intervals and a neutral point of the stator winding being electrically connected to a rectifier for rectifying alternating-current output, wherein each of the strands of wire constituting the three winding phase portions is led out from a coil end group of the stator winding to an outer side to constitute a neutral-point terminal, each of the neutral-point terminals havs a flat side surface portion, and a neutral-point joint portion of the stator winding is constructed by abutting and electrically joining the flat side surface portions of the neutral-point terminal.

The strands of wire may be conducting wires having a rectangular cross section.

The neutral-point terminals of the strands of wire constituting the three winding phase portions may include:

a first neutral-point terminal positioned centrally in a circumferential direction, the first neutral-point terminal being led axially outwards from the coil end group to constitute a neutral-point lead portion connected to the rectifier; and second and third neutral-point terminals positioned on first and second sides in the circumferential direction, each being led axially outwards from the coil end group, then bent, and led around to the first neutral-point terminal, wherein the side surface portions at tips of the second and third neutral-point terminals are abutted and electrically joined from the first and second sides in the circumferential direction to the side surface portions of a portion of the first neutral-point terminal led out from the coil end group.

The stator may also include a connecting member composed of a conductor having flat side surface portions, the flat side surface portions of the neutral-point terminals and the connecting member being abutted and electrically joined to each other.

The connecting member may constitute a neutral-point lead portion connected to the rectifier.

At least a part of the neutral-point terminals extending from the coil end group to the outer side may be secured to the coil end group by means of an electrically-insulating resin portion.

The electrical joining may be welding.

DETAILED DESCRIPTION OF THE PREFERRED EMBODIMENTS

The preferred embodiments of the present invention will now be explained with reference to the drawings.

Embodiment 1

Figure 1:
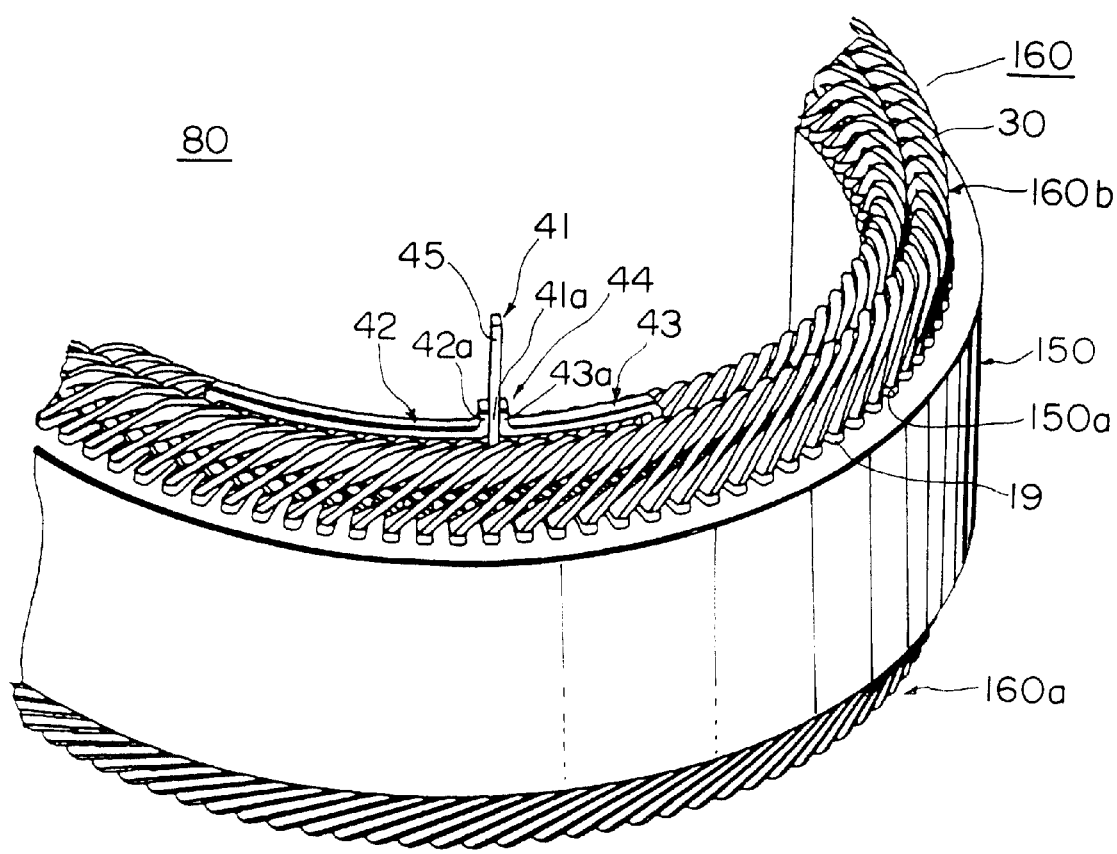
FIG. 1 is a partial perspective of a stator for an alternator according to Embodiment 1 of the present invention viewed from a rear end.
Figure 2:
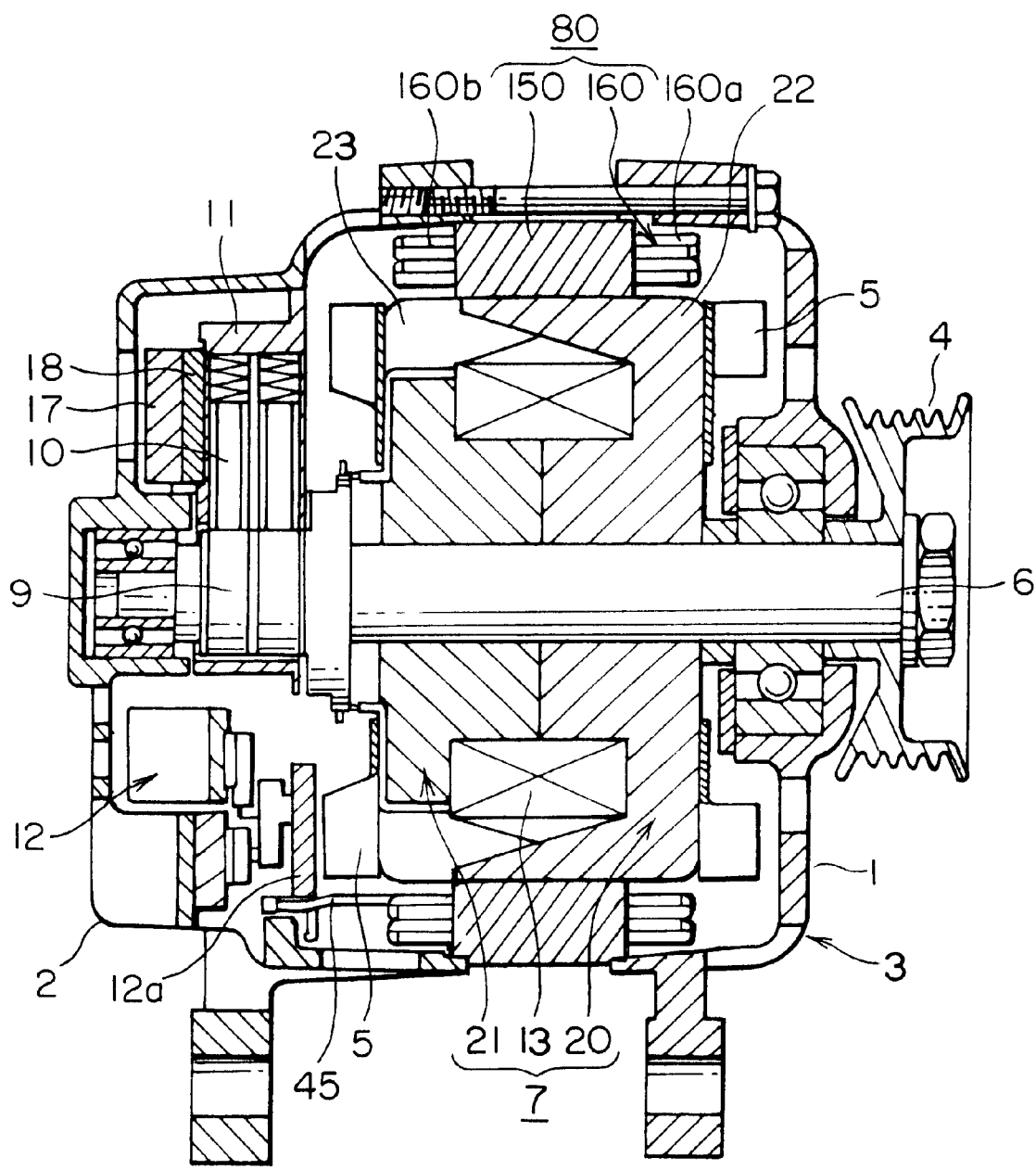
FIG. 2 is a cross section showing a construction of an alternator mounted with the stator according to Embodiment 1 of the present invention.
Figure 3:
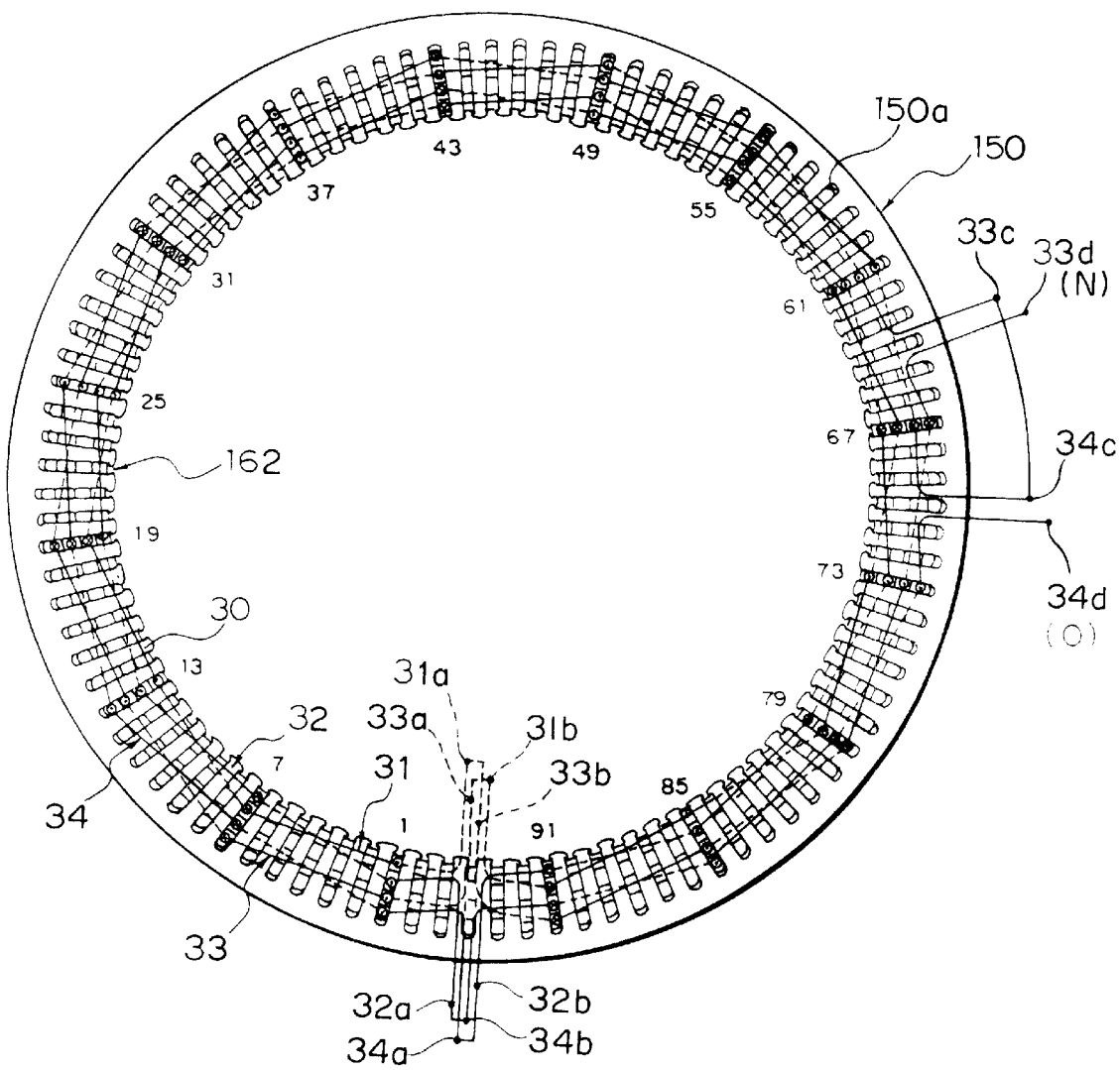
FIG. 3 is a rear end elevation explaining a winding construction of one stator winding phase portion in the stator for an alternator according to Embodiment 1 of the present invention.
Figure 4:
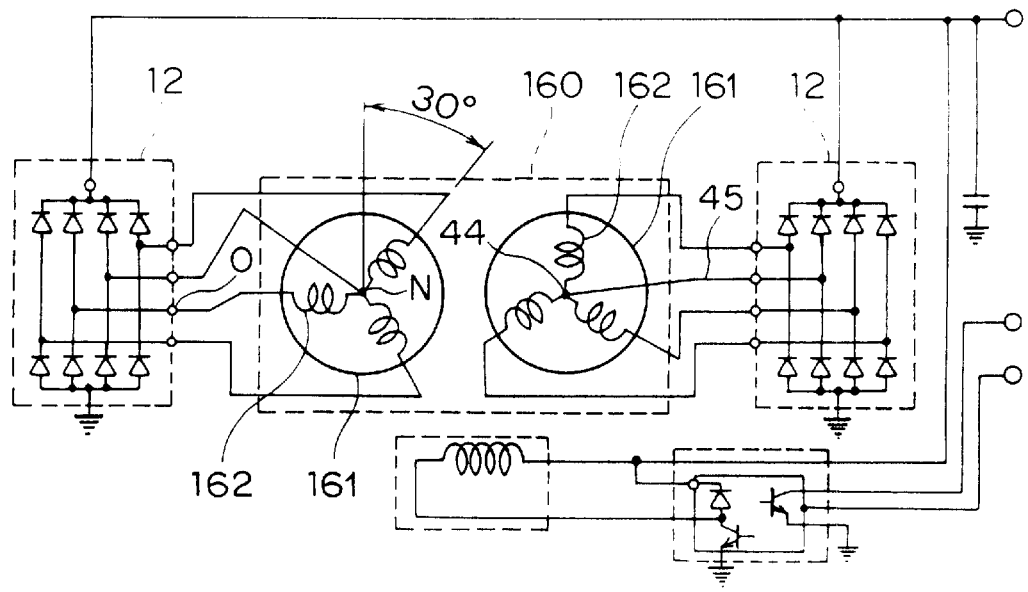
FIG. 4 is a circuit diagram for the stator for an alternator according to Embodiment 1 of the present invention.

FIG. 1 is a partial perspective of a stator for an alternator according to Embodiment 1 of the present invention viewed from a rear end, FIG. 2 is a cross section showing a construction of an alternator mounted with the stator according to Embodiment 1 of the present invention, FIG. 3 is a rear end elevation explaining a winding construction of one stator winding phase portion in the stator for an alternator according to Embodiment 1 of the present invention, and FIG. 4 is a circuit diagram for the stator for an alternator according to Embodiment 1 of the present invention.

In FIG. 1, a stator 80 includes: a cylindrical stator core 150 formed with a number of slots 150a extending axially at a predetermined pitch in a circumferential direction; a stator winding 160 wound into the stator core 150; and insulators 19 mounted inside each of the slots 150a for electrically insulating the stator winding 160 from the stator core 150. The stator winding 160 is provided with a number of winding sub-portions in each of which one strand of wire 30 is wound into a wave winding so as to alternately occupy an inner layer and an outer layer in a slot depth direction within the slots 150a at intervals of a predetermined number of slots, the strands of wire folding back outside the slots 150a at end surfaces of the stator core 150. Furthermore, turn portions formed by folding the strands of wire 30 back outside the slots 150a at the end surfaces of the stator core 150 are arranged circumferentially to line up in two rows radially, constituting front-end and rear-end coil end groups 160a and 160b.

Now, in the stator core 150, ninety-six slots 150a are formed at even pitch so as to house first and second three-phase stator winding portions 161 described below such that the number of slots housing each phase portion of the three-phase winding portions 161 corresponds to the number of magnetic poles (sixteen) in a rotor 7. Furthermore, a conducting wire made of a long strand of copper or the like having a rectangular cross section coated with insulation is used for the strands of wire 30.

In the stator 80, each of the first and second three-phase stator winding portions 161 has first, second, and third neutral-point terminals 41, 42, and 43, the first neutral-point terminal 41 which is positioned centrally in a circumferential direction being led out parallel to the axial direction from the rear-end coil end group 160b to an outer side, and the second and third neutral-point terminals 42 and 43 which are positioned on first and second sides in the circumferential direction each being led out parallel to the axial direction from the rear-end coil end group 160b to the outer side, then bent, led around as far as a led-out portion 41a of the first neutral-point terminal 41 along apex portions of the rear-end coil end group 160b in a plane perpendicular to the axial direction, and then bent parallel to the axial direction. Then, side surface portions of bent tips 42a and 43a of the second and third neutral-point terminals 42 and 43 are abutted to first and second side surface portions of the led-out portion 41a of the first neutral-point terminal 41 from the first and second sides, and electrically connected and integrated by tungsten-inert gas (TIG) welding, for example. Thus, a neutral-point joint portion 44 is constituted by the first, second, and third neutral-point terminals 41, 42, and 43.

Furthermore, the first neutral-point terminal 41 extends outwards parallel to the axial direction from the neutral-point joint portion 44, and the extended portion thereof constitutes a neutral-point lead portion 45.

Moreover, the neutral-point joint portion 44 and the neutral-point lead portion 45 of only the first three-phase stator winding portion 161 are shown in FIG. 1, but in reality there is also a neutral-point joint portion and a neutral-point lead portion for the second three-phase stator winding portion 161. Furthermore, output wires are omitted from FIG. 1.

Furthermore, the insulation coating is stripped from the abutted side surface portions of the tips 42a and 43a of the second and third neutral-point terminals 42 and 43. Similarly, the insulation coating is also stripped from the abutted side surface portions of the led-out portion 41a of the first neutral-point terminal 41.

The stator 80 constructed in this manner is mounted to an alternator as shown in FIG. 2, and the neutral-point lead portions 45 of the first and second three-phase stator winding portions 161 constituting the stator winding 160 are led out parallel to the axial direction from the stator core 150 together with output wires (not shown), are fastened by means of crimping to terminals of circuit boards 12a of rectifiers 12, and are electrically connected by soldering. Thus, an alternator is provided in which output can be increased when the alternator is rotating at high speed by adding neutral-point voltage to the direct current output.

Figure 9:
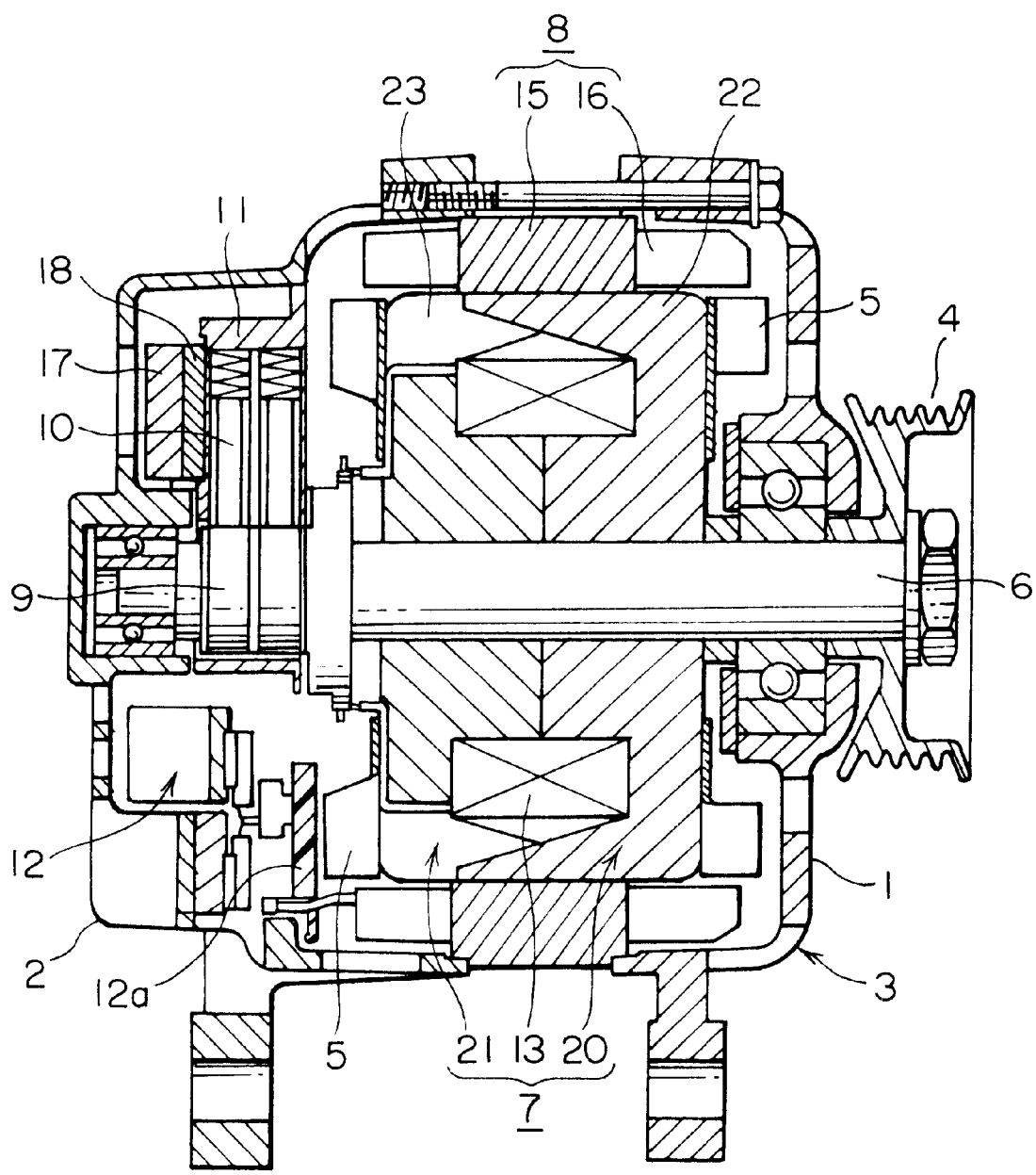
FIG. 9 is a cross section showing a conventional alternator.
Figure 10:
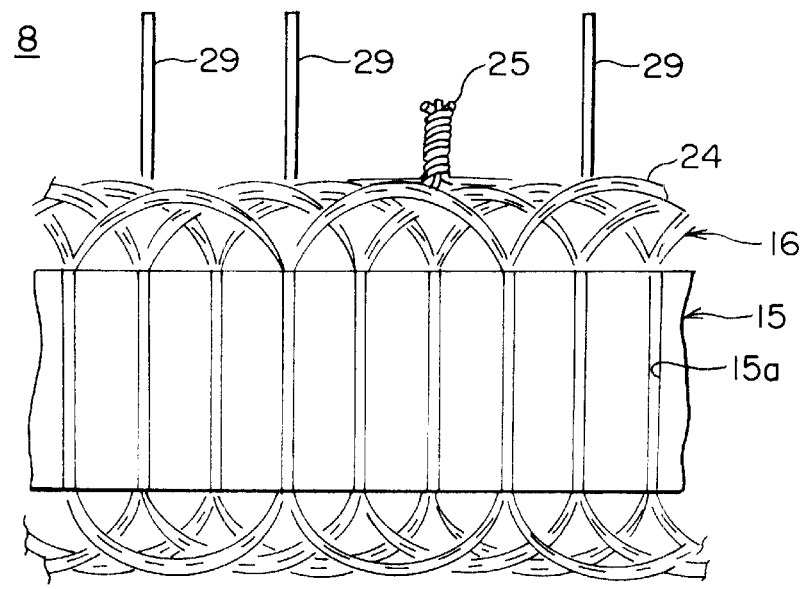
FIG. 10 is a partial front elevation showing part of a stator for mounting in a conventional alternator.
Figure 11:
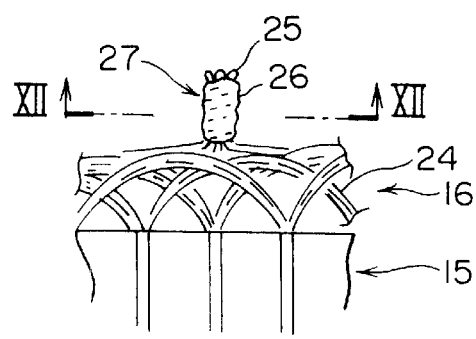
FIG. 11 is a partial front elevation showing the vicinity of a neutral-point joint portion of a stator for mounting in a conventional alternator.
Figure 12:
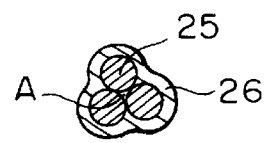
FIG. 12 is a cross section taken along line XII—XII in FIG. 11 in the direction of the arrows.

Moreover, except for the fact that the stator 80 is used instead of the stator 8, this alternator is constructed similarly to the conventional alternator shown in FIG. 9.

Next, the winding construction of one stator winding phase group 162 served as a winding phase portion will be explained in detail with reference to FIG. 3. Moreover, in the diagram, the rear-end wiring is indicated by solid lines and the front-end wiring is indicated by broken lines.

One stator winding phase group 162 is constituted by first to fourth winding sub-portions 31 to 34 each formed from one strand of wire 30. The first winding sub-portion 31 is constructed by winding one strand of wire 30 into a wave winding in every sixth slot from Slot Numbers 1 to 91 so as to alternately occupy a first position from an inner circumferential side (hereinafter called the first address) and a second position from the inner circumferential side (hereinafter called the second address) inside the slots 150a. The second winding sub-portion 32 is constructed by winding a strand of wire 30 into a wave winding in every sixth slot from Slot Numbers 1 to 91 so as to alternately occupy the second address and the first address inside the slots 150a. The third winding sub-portion 33 is constructed by winding a strand of wire 30 into a wave winding in every sixth slot from Slot Numbers 1 to 91 so as to alternately occupy a third position from the inner circumferential side (hereinafter called the third address) and a fourth position from the inner circumferential side (hereinafter called the fourth address) inside the slots 150a. The fourth winding sub-portion 34 is constructed by winding a strand of wire 30 into a wave winding in every sixth slot from Slot Numbers 1 to 91 so as to alternately occupy the fourth address and the third address inside the slots 150a. Thus, four strands of wire 30 are arranged to line up in one row within each of the slots 150a with the longitudinal direction of the rectangular cross sections thereof aligned in a radial direction.

At the front end of the stator core 150, a first end portion 31a of the first winding sub-portion 31 extending outwards from Slot Number 1 and a second end portion 33b of the third winding sub-portion 33 extending outwards from Slot Number 91 are joined, and in addition, a first end portion 33a of the third winding sub-portion 33 extending outwards from Slot Number 1 and a second end portion 31b of the first winding sub-portion 31 extending outwards from Slot Number 91 are joined to form a winding portion having two turns.

At the rear end of the stator core 150, a first end portion 32a of the second winding sub-portion 32 extending outwards from Slot Number 1 and a second end portion 34b of the fourth winding sub-portion 34 extending outwards from Slot Number 91 are joined, and in addition, a first end portion 34a of the fourth winding sub-portion 34 extending outwards from Slot Number 1 and a second end portion 32b of the second winding sub-portion 32 extending outwards from Slot Number 91 are joined to form a winding portion having two turns.

In addition, a portion of the strand of wire 30 of the third winding sub-portion 33 extending outwards at the rear end of the stator core 150 from Slot Numbers 61 and 67 is cut, and a portion of the strand of wire 30 of the fourth winding sub-portion 34 extending outwards at the rear end of the stator core 150 from Slot Numbers 67 and 73 is also cut. A first cut end 33c of the third winding sub-portion 33 and a first cut end 34c of the fourth winding sub-portion 34 are joined to form one stator winding phase group 162 having four turns connecting the first to fourth winding sub-portions 31 to 34 in series.

Moreover, a second cut end 33d of the third winding sub-portion 33 and a second cut end 34d of the fourth winding sub-portion 34 become a neutral-point (N) and an output wire (O), respectively.

A total of six stator winding phase groups 162 are similarly formed by offsetting the slots 150a into which the strands of wire 30 are wound by one slot at a time.

Here, three of the second cut ends 33d of the third winding sub-portions 33 constituting three stator winding phase groups 162 correspond to the above-mentioned first, second, and third neutral-point terminals 41, 42, and 43.

Of the three second cut ends 33d, a first second cut end 33d which is positioned centrally in a circumferential direction is led out parallel to the axial direction from the rear-end coil end group 160b to an outer side. Second and third second cut ends 33d which are positioned on the first and second sides in a circumferential direction are each led out parallel to the axial direction from the rear-end coil end group 160b to the outer side, then bent, led around as far as a led-out portion of the first second cut end 33d along apex portions of the rear-end coil end group 160b in a plane perpendicular to the axial direction, and then bent parallel to the axial direction. Then, side surface portions of bent tips of the second and third second cut ends 33d are abutted to first and second side surface portions of the led-out portion of the first second cut ends 33d from the first and second sides, and the abutted portions of the first, second, and third second cut ends 33d are held in a clamping jig (not shown). Then, electrodes (not shown) are brought close to the abutted portions, and an arc is generated between the electrodes and the abutted portions, fusing and joining the second cut ends 33d to each other. In other words, a neutral-point joint portion is formed by fusing and joining the second cut ends 33 to each other by TIG welding. Thus, the first three-phase stator winding portion 161 is obtained by forming three stator winding phase groups 162 into a star connection. The second three-phase stator winding portion 161 is similarly obtained by forming the remaining three stator winding phase groups 162 into a star connection. Then, the first second cut ends 33d which are positioned centrally in a circumferential direction in the first and second three-phase stator winding portions 161 are extended outwards parallel to the axial direction to become neutral-point lead portions, and are connected to the rectifiers 12.

Thus, as shown in FIG. 4, the first and second three-phase stator winding portions 161 are formed by forming three each of the stator winding phase groups 162 into each of two star connections, each of the three-phase stator winding portions 161 being connected to its own rectifier 12. The direct current output from the rectifiers 12 is connected in parallel and combined.

According to Embodiment 1, because the neutral-point joint portions 44 are constructed by abutting the flat side surface portions of the tips 42a and 43a of the second and third neutral-point terminals 42 and 43 on the first and second sides in a circumferential direction to the flat first and second side surface portions of the led-out portion 41a of the first neutral-point terminal 41 positioned centrally in the circumferential direction, the joint portions of the first, second, and third neutral-point terminals 41, 42, and 43 are abutted in a reliable state of surface contact, enabling stable joining to be performed. Thus, the joint strength of the neutral-point joint portions 44 is sufficiently strong to prevent joint dislodgment of the neutral-point joint portions 44, enabling reliability to be improved. Furthermore, even if the neutral-point joint portions 44 are subjected to vibration when mounted to a vehicle, the occurrence of joint dislodgment is suppressed, improving reliability from this point of view also. In addition, the high-capacity jig and the process of sufficiently heating the joint portions which was necessary when the neutral-point joint portions were formed by soldering is no longer necessary, enabling the joining process to be carried out in a short time at low cost. Furthermore, because it is not necessary to gather and twist the neutral-point terminals by hand, the joining operation is considerably improved.

Furthermore, because excessive leading around and twisting is no longer required, the amount of lead-around of the second and third neutral-point terminals 42 and 43 is reduced. Thus, increases in the amount of conducting wire, which is a heat generating body, are suppressed, in other words, increases in the amount of heat generated and in electrical resistance are suppressed, enabling drops in the power-generating efficiency to be suppressed, and enabling the prevention of breakages of the winding and interference with other parts due to vibration when the alternator is mounted to the vehicle. Furthermore, because vibration resistance is improved in proportion to the reduction in the amount of lead-around of the second and third neutral-point terminals 42 and 43, it is no longer necessary to secure the second and third neutral-point terminals 42 and 43 to the rear-end coil end group 160b using tie-shaped bodies or to secure the first, second, and third neutral-point terminals 41, 42, and 43 to each other using stops.

Furthermore, because the first, second, and third neutral-point terminals 41, 42, and 43 are joined using electrical joining such as TIG welding, it is no longer necessary to use solder containing harmful substances such as lead, making the present invention effective from the point of view of environmental protection as well.

Because conducting wires having a rectangular cross section are used for the strands of wire 30, flat side surface portions are already formed on the first, second, and third neutral-point terminals 41, 42, and 43. Thus, abutting in a surface contact state can be achieved simply by abutting any side surface portions of the first, second, and third neutral-point terminals 41, 42, and 43, simplifying the process of joining the neutral-point joint portions 44.

Because the neutral-point lead portions 45 are constructed by leading the first neutral-point terminals 41, which are positioned centrally in a circumferential direction, out from the neutral-point joint portions 44, there is no need to dispose neutral-point lead portions separately.

Embodiment 2

Figure 5:
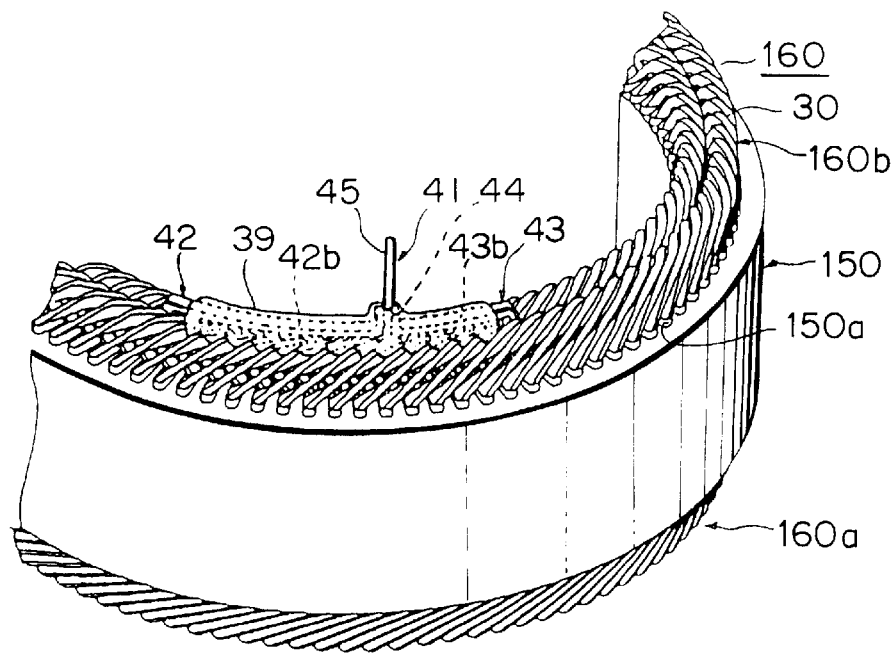
FIG. 5 is a partial perspective of a stator for an alternator according to Embodiment 2 of the present invention viewed from the rear end.

FIG. 5 is a partial perspective of a stator for an alternator according to Embodiment 2 of the present invention viewed from the rear end.

In FIG. 5, lead-around portions 42b and 43b of the second and third neutral-point terminals 42 and 43 and the neutral-point joint portions 44 are fastened to the apex portions of the rear-end coil end group 160b by an electrically-insulating resin portion 39 of epoxy resin or the like.

Moreover, the rest of the construction is constructed similarly to Embodiment 1.

According to Embodiment 2, because the lead-around portions 42b and 43b of the second and third neutral-point terminals 42 and 43 and the neutral-point joint portions 44 are fastened to the apex portions of the rear-end coil end group 160b by an electrically-insulating resin portion 39 of epoxy resin or the like, the occurrence of joint dislodgment is suppressed even if the neutral-point joint portions 44 are subjected to vibration when mounted to the vehicle, improving reliability significantly.

Moreover, in Embodiment 2 above, the electrically-insulating resin portion 39 is disposed so as to fasten the lead-around portions 42b and 43b and the neutral-point joint portions 44 to the rear-end coil end group 160b, but the electrically-insulating resin portion 39 may be disposed so as to fasten a part of the lead-around portions 42b and 43b to the rear-end coil end group 160b, or it may be disposed so as to fasten only the neutral-point joint portions 44 to the rear-end coil end group 160b.

Embodiment 3

Figure 6:
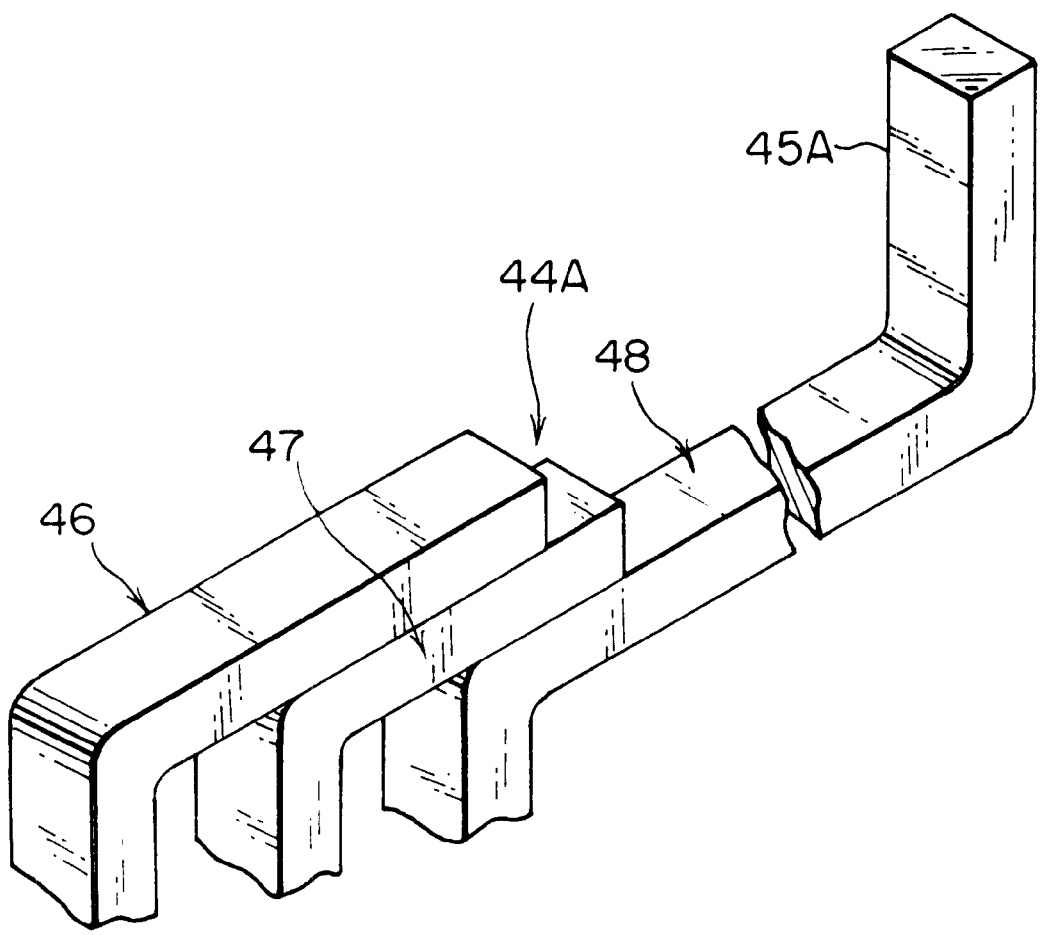
FIG. 6 is a partial perspective showing the vicinity of a neutral-point joint portion of a stator for an alternator according to Embodiment 3 of the present invention.

FIG. 6 is a partial perspective showing the vicinity of a neutral-point joint portion in a stator for an alternator according to Embodiment 3 of the present invention.

In FIG. 6, first, second, and third neutral-point terminals 46, 47, and 48 of a three-phase stator winding portion are each led out parallel to the axial direction from the rear-end coil end group to an outer side, are then bent, and led around to a first side in a circumferential direction along apex portions of the rear-end coil end group. Then, the first, second, and third neutral-point terminals 46, 47, and 48 are stacked axially with flat side surface portions abutted to each other in the vicinity of the position where the third neutral-point terminal 48 positioned on the first side in the circumferential direction is led out from the rear-end coil end group 160b. Furthermore, a neutral-point lead portion 45A is constructed by additionally bending the third neutral-point terminal 48 parallel to the axial direction.

Then, the abutted portions of the neutral-point terminals 46, 47, and 48 are held down from an axially outer side using a jig (not shown), electrodes (not shown) are brought close, and an arc is generated between the electrodes and the abutted portions, fusing and joining the neutral-point terminals 46, 47, and 48 to each other to form a neutral-point joint portion 44A.

Moreover, the rest of the construction is constructed similarly to Embodiment 1.

Consequently, because the flat side surface portions of the first, second, and third neutral-point terminals 46, 47, and 48 are abutted to each other and TIG welded, similar effects to those of Embodiment 1 can also be obtained in Embodiment 3.

Furthermore, according to Embodiment 3, because the neutral-point terminals 46, 47, and 48 are stacked axially at the abutted portions, the abutted portions can be held down from an axially outer side using the jig and TIG welded. Thus, a clamping jig in which the abutted portions are clamped is no longer necessary, improving workability.

Embodiment 4

Figure 7:
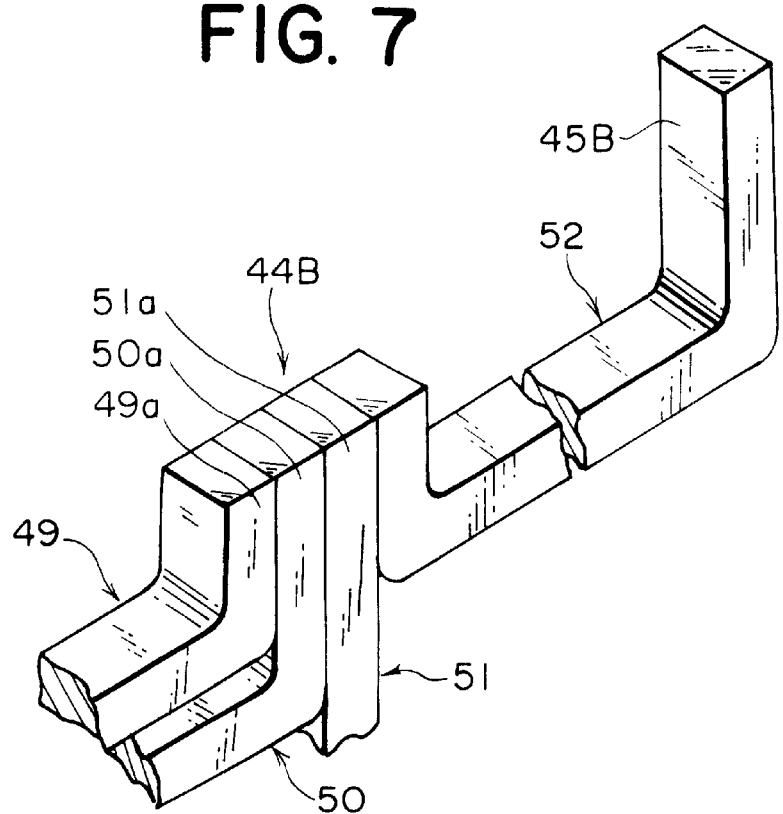
FIG. 7 is a partial perspective showing the vicinity of a neutral-point joint portion of a stator for an alternator according to Embodiment 4 of the present invention.

FIG. 7 is a partial perspective showing the vicinity of a neutral-point joint portion of a stator for an alternator according to Embodiment 4 of the present invention.

In FIG. 7, first, second, and third neutral-point terminals 49, 50, and 51 of a three-phase stator winding portion are each led out parallel to the axial direction from the rear-end coil end group to an outer side. Then the first and second neutral-point terminals 49 and 50 are each bent, and led around to a first side in a circumferential direction along apex portions of the rear-end coil end group, and are then bent parallel to the axial direction in the vicinity of the position where the third neutral-point terminal 51 positioned on the first side in the circumferential direction is led out from the rear-end coil end group. Then, bent tip portions 49a and 50a of the first and second neutral-point terminals 49 and 50 and a tip portion 51a of the third neutral-point terminal 51 led out from the rear-end coil end group are stacked in a circumferential direction, and flat side surface portions thereof are abutted to each other. In addition, a flat side surface portion of a first end of a connecting member 52 composed of a conductor having a rectangular cross section formed into a U shape is abutted to the tip portion 51a of the third neutral-point terminal 51 from the first side in the circumferential direction. Furthermore, a second end of the connecting member 52 extends further outwards parallel to the axial direction to constitute a neutral-point lead portion 45B.

Then, the abutted portions of the neutral-point terminals 49, 50, and 51 and the connecting member 52 are held in a clamping jig (not shown), electrodes (not shown) are brought close, and an arc is generated between the electrodes and the abutted portions, fusing and joining the neutral-point terminals 49, 50, and 51 and the connecting member 52 to each other to form a neutral-point joint portion 44B.

Moreover, the rest of the construction is constructed similarly to Embodiment 1.

Consequently, because the flat side surface portions of the first, second, and third neutral-point terminals 49, 50, and 51 and the connecting member 52 are abutted to each other and TIG welded, similar effects to those in Embodiment 1 can also be obtained in Embodiment 4.

Now, when automation of the joining operation is being considered, it becomes important to move the welding jig parallel to the axis of the stator core and place it close to the weld portion. According to Embodiment 4, because the side surface portions of the tip portions of the neutral-point terminals, 49, 50, and 51 and the connecting member 52 are abutted to each other by stacking them in a circumferential direction, there is an open space axially outside the abutted portions and there are no obstacles to the axial movement of the welding jig, making it suitable for mass production.

Embodiment 5

Figure 8:
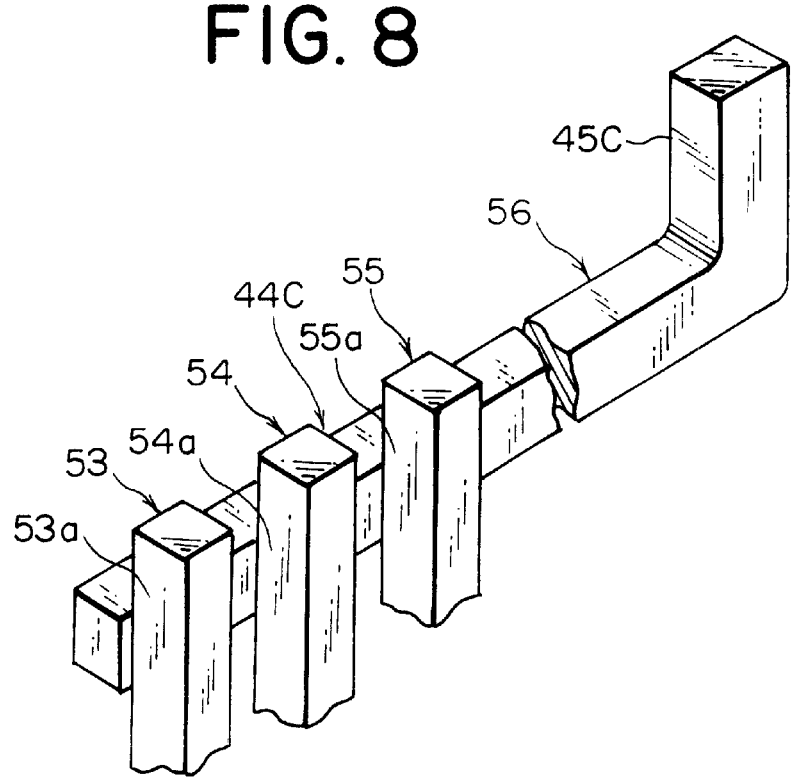
FIG. 8 is a partial perspective showing the vicinity of a neutral-point joint portion of a stator for an alternator according to Embodiment 5 of the present invention.

FIG. 8 is a partial perspective showing the vicinity of a neutral-point joint portion of a stator for an alternator according to Embodiment 5 of the present invention.

In FIG. 8, three neutral-point terminals 53, 54, and 55 of a three-phase stator winding portion are each led out parallel to the axial direction from the rear-end coil end group to an outer side by a predetermined length. Then, a connecting member 56 composed of a conductor having a rectangular cross section is disposed so as to extend in a circumferential direction along the apex portions of the rear-end coil end group, and flat side surface portions at a first end of the connecting member 56 are abutted to tip portions 53*a*, 54*a*, and 55*a* of each of the three neutral-point terminals 53, 54, and 55 from a first side in a radial direction. In addition, a second end of the connecting member 56 extends outwards parallel to the axial direction to constitute a neutral-point lead portion 45C.

Then, the abutted portions of the neutral-point terminals 53, 54, and 55 and the connecting member 56 are held in a clamping jig (not shown), electrodes (not shown) are brought close, and an arc is generated between the electrodes and each of the abutted portions, fusing and joining the neutral-point terminals 53, 54, and 55 to the connecting member 52 in sequence to form a neutral-point joint portion 44C.

Moreover, the rest of the construction is constructed similarly to Embodiment 1.

Consequently, because the flat side surface portions of the three neutral-point terminals 53, 54, and 55 and the connecting member 56 are abutted to each other and TIG welded, similar effects to those in Embodiment 1 can also be obtained in Embodiment 5.

According to Embodiment 5, the length of the neutral-point terminals 53, 54, and 55 led out from the coil end group can be made uniform, simplifying the joining operation and reducing damage to the winding during joining.

Because the neutral-point terminals 53, 54, and 55 and the connecting member 56 are welded two at a time, the weld portion becomes compact, providing a neutral-point joint portion 44C that is highly reliable electrically as well.

Because the length of the neutral-point terminals 53, 54, and 55 led out from the coil end group can be shortened, resistance to vibration in the neutral-point joint portion 44C is increased, improving reliability, and interference between the neutral-point joint portion 44C and the circuit boards 12*a* disposed facing the stator can be avoided, increasing the degree of planning freedom.

Because the neutral-point lead portion 45C is constituted by a separate member from the neutral-point terminals, in other words, by the connecting member 56, it is not restricted to the dimensions, shape, or material of the strands of wire 30 in the stator winding, but can be constructed with any dimension, shape, or material. Thus, by selecting the dimension, shape, and material of the connecting member 56 so as to have great strength, the strength of the neutral-point joint portion 44C can be increased. Furthermore, the position of the neutral-point lead portion 45C can also be set arbitrarily to match that of the circuit board 12*a*, improving assembly.

Here, when the neutral-point joint portion 44C is to be secured to the rear-end coil end by an electrically-insulating resin portion, because the length of the neutral-point terminals 53, 54, and 55 led out from the coil end group can be shortened, only a small quantity of electrically-insulating resin is required, enabling costs to be reduced.

Moreover, in each of the above embodiments, conducting wires having a rectangular cross section are used for the strands of wire 30, but the strands of wire are not limited to conducting wires having a rectangular cross section, and conducting wires having a circular cross section may be used. In that case, the portion of the conductor constituting the neutral-point joint portion may be deformed so as to have flat side surface portions.

Furthermore, in each of the above embodiments, the stator winding 160 used includes a number of winding subportions in each of which one strand of wire 30 is wound into a wave winding so as to alternately occupy an inner layer and an outer layer in a slot depth direction within the slots 150*a* at intervals of a predetermined number of slots, the strands of wire folding back outside the slots 150*a* at axial end surfaces of the stator core 150, but the present invention is not restricted to a stator winding 160 constructed in this manner, and a stator winding which is constructed using coil segments formed into a general U shape for the strands of wire may be used by inserting the coil segments sequentially into the slots and joining together end portions of the coil segments extending outwards from the slots.

Furthermore, in each of the above embodiments, the neutral-point joint portions are explained as being disposed at the rear end of the stator, but if the rectifiers 12 are disposed at the front end, the neutral-point joint portions will also be disposed at the front end of the stator.

The present invention is constructed in the above manner and exhibits the effects described below.

According to one aspect of the present invention, there is provided a stator for an alternator, the stator including:

a cylindrical stator core formed circumferentially with a number of slots extending axially; and a stator winding composed of a three-phase stator winding portion constructed by connecting three winding phase portions into a three-phase star connection, each of the winding phase portions being installed in the stator core by sequentially inserting strands of wire into the slots at predetermined intervals and a neutral point of the stator winding being electrically connected to a rectifier for rectifying alternating-current output, wherein each of the strands of wire constituting the three winding phase portions is led out from a coil end group of the stator winding to an outer side to constitute a neutral-point terminal, each of the neutral-point terminals has a flat side surface portion, a neutral-point joint portion of the stator winding is constructed by abutting and electrically joining the flat side surface portions of the neutral-point terminals, whereby the intricate process of integrating the neutral-point terminals by twisting or using stops is no longer required and sufficient joint strength can be ensured simply, enabling the provision of a stator for an alternator enabling reliability to be improved and costs to be reduced.

The strands of wire may be conducting wires having a rectangular cross section, making the process of forming flat side surface portions in the abutted portions of the neutral-point terminals unnecessary, thereby improving workability.

The neutral-point terminals of the strands of wire constituting the three winding phase portions may include:

a first neutral-point terminal positioned centrally in a circumferential direction, the first neutral-point terminal being led axially outwards from the coil end group to constitute a neutral-point lead portion connected to the rectifier; and second and third neutral-point terminals positioned on first and second sides in the circumferential direction, each being led axially outwards from the coil end group, then bent, and led around to the first neutral-point terminal, wherein the side surface portions at tips of the second and third neutral-point terminals are abutted and electrically joined from the first and second sides in the circumferential direction to the side surface portions of a portion of the first neutral-point terminal led out from the coil end group, reducing the amount of lead-around of the neutral-point terminals, increasing vibration resistance, thereby improving reliability.

The stator may also include a connecting member composed of a conductor having flat side surface portions, the flat side surface portions of the neutral-point terminals and the connecting member being abutted and electrically joined to each other, increasing joint strength in the neutral-point joint portion, thereby improving reliability.

The connecting member may constitute a neutral-point lead portion connected to the rectifier, enabling the strength of the neutral-point joint portion to be increased by selecting the connecting material, and enabling the position of the neutral-point lead portion to be set arbitrarily to match that of the circuit board, thereby improving assembly.

At least a part of the neutral-point terminals extending from the coil end group to the outer side may be secured to the coil end group by means of an electrically-insulating resin portion, increasing the vibration resistance of the neutral-point joint portion, thereby improving reliability.

The electrical joining may be welding, eliminating the use of solders containing harmful substances, which is effective from the point of view of environmental protection.

What is claimed is:

1. A stator for an alternator, said stator comprising:
    a cylindrical stator core formed circumferentially with a number of slots extending axially; and
    a stator winding composed of a three-phase stator winding portion constructed by connecting three winding phase portions into a three-phase star connection, each of said winding phase portions being installed in said stator core by sequentially inserting strands of wire into said slots at predetermined intervals and a neutral point of said stator winding being electrically connected to a rectifier for rectifying alternating-current output, wherein each of said strands of wire constituting said three winding phase portions is led out from a coil end group of said stator winding to an outer side to constitute a neutral-point terminal, and each of said neutral-point terminals has a flat side surface portion; and
    a connecting member including a conductor having flat side surface portions, said flat side surface portions of said neutral-point terminals and said connecting member being abutted and electrically joined to each other to form a neutral-point joint portion of said stator winding.

2. The stator for an alternator according to claim 1 wherein said strands of wire are conducting wires having a rectangular cross section.

3. The stator for an alternator according to claim 1 wherein said connecting member constitutes a neutral-point lead portion connected to said rectifier.

4. The stator for an alternator according to claim 1 wherein at least a part of said neutral-point terminals extending from said coil end group to said outer side is secured to said coil end group by means of an electrically-insulating resin portion.

5. The stator for an alternator according to claim 1 wherein said electrical joining is welding.

6. The stator for an alternator according to claim 1, wherein said neutral-point terminals comprise first, second and third neutral point terminals including tip portions extending in the axial direction,
    said connecting member includes first and second portions extending in the axial direction, and a third portion disposed between said first and second portions and extending the in circumferential direction,
    said side surface portions of said tip portions of said first, second and third neutral-point terminals and said first portion of said connecting member being abutted and electrically joined to form said neutral-point joint portion.

7. The stator for an alternator according to claim 1, wherein said connecting member extends in a circumferential direction along apex portions of said coil end group, said flat side surface portions of said neutral-point terminals being abutted and electrically joined to one of said flat side surface portions of said connecting member to form said neutral-point joint portion of said stator winding.

8. A stator for an alternator, said stator comprising:
    a cylindrical stator core formed circumferentially with a number of slots extending axially; and
    a stator winding composed of a three-phase stator winding portion constructed by connecting three winding phase portions into a three-phase star connection, each of said winding phase portions being installed in said stator core by sequentially inserting strands of wire into said slots at predetermined intervals and a neutral point of said stator winding being electrically connected to a rectifier for rectifying alternating-current output, wherein
    each of said strands of wire constituting said three winding phase portions is led out from a coil end group of said stator winding to an outer side to constitute a neutral-point terminal,
    each of said neutral-point terminals has a flat side surface portion,
    said neutral-point terminals of said strands of wire constituting said three winding phase portions comprise first, second and third neutral-point terminals, each extending axially outwards from said coil end group and then being bent so as to extend in the circumferential direction along apex portions of said coil end group with said first, second and third neutral-point terminals being stacked in the axial direction,
    said side surface portions of said first, second and third neutral-point terminals being abutted and electrically joined where said first, second and third neutral-point terminals are stacked in the axial direction to form a neutral-point joint portion of said stator winding, and
    said third neutral-point terminal further extending in the circumferential direction from said neutral-point joint portion to constitute a neutral-point lead portion connected to said rectifier.

* * * * *